Figure 1:
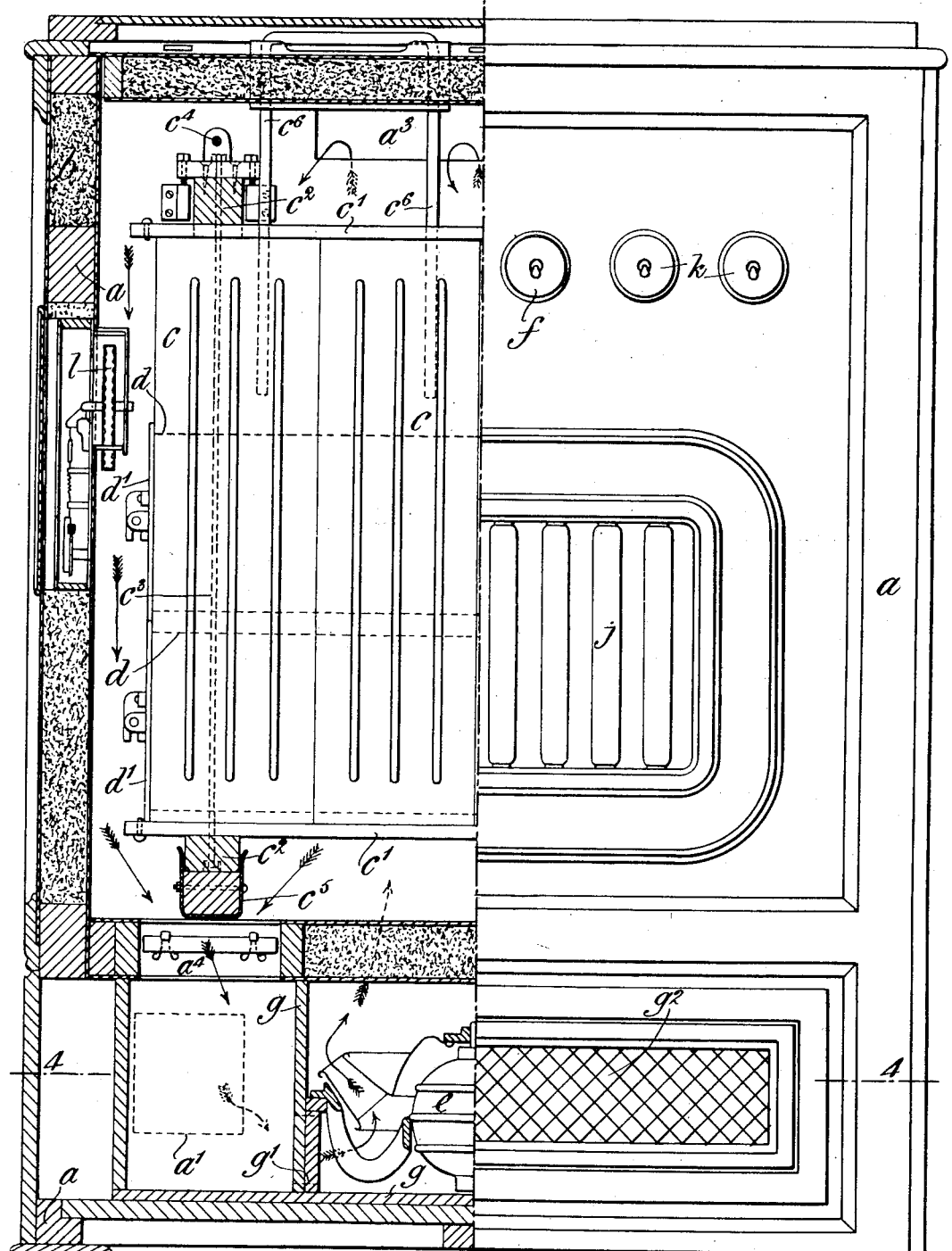

A. F. HARRISON & O. L. PEARD.
HEATING APPLIANCE.
APPLICATION FILED SEPT. 19, 1912.

1,054,409.

Patented Feb. 25, 1913.
3 SHEETS—SHEET 3.

UNITED STATES PATENT OFFICE.

ALFRED FRANK HARRISON, OF WEYBRIDGE, AND OLIVER LEOPOLD PEARD, OF CROYDON, ENGLAND.

HEATING APPLIANCE.

1,054,409.  Specification of Letters Patent.  Patented Feb. 25, 1913.

Application filed September 19, 1912. Serial No. 721,241.

*To all whom it may concern:*

Be it known that we, ALFRED FRANK HARRISON and OLIVER LEOPOLD PEARD, subjects of the King of Great Britain, residing, respectively, at "Tilecot," Curzon Road, Weybridge, and 42 Dingwall road, Croydon, both in the county of Surrey, England, have invented new and useful Improvements in Heating Appliances, of which the following is a specification.

This invention relates to means whereby heat energy accumulated at low rates over prolonged periods may be released in large quantities and utilized as required, and its object is to render more highly economical both as regards first cost and use, commercial heating appliances which are not continuously in application.

As is well known heating appliances such as radiators, water heaters, and the like which are used intermittently demand a high rate of heat supply when in operation, which supply can only be obtained from relatively large and costly generating and transmitting arrangements. If however the same quantity of heat be generated at a low rate continuously or even approximately so, the size, maximum output, and first cost of both the generating apparatus and the pipes or wires transmitting the energy to the heating appliances will be greatly reduced. The demand becomes continuous and the capital cost is greatly decreased. To this end the heat generated by electric currents or other means is accumulated and stored in the heating appliances in such a manner that it may be released and utilized as required.

According to this invention the heating appliance in each case consists of a heat reservoir or storage element inclosed within a non-conducting covering or envelop for reducing losses by radiation with means for transmitting heat to the storage material at low rates and abstracting heat therefrom at higher rates for shorter periods. The heat reservoir preferably contains a substance which at the lower temperatures is in a solid or semi-solid state and possesses a high latent heat of liquefaction and whose melting point should approximate to the temperature of the heat ordinarily required from the particular apparatus. It is also desirable that the resolidification may be readily induced near the same temperature at which liquefaction takes place thus releasing and rendering available its latent heat of fusion at the desired temperature of heat abstraction.

It is well known that acetate of soda containing water of crystallization is an excellent storage material. When the crystalline form of this salt is melted a large amount of heat is absorbed without any sensible rise in temperature and this latent heat of fusion is released and given out when recrystallization takes place, the temperature being maintained between 135° and 140° Fah. until the material has resumed the crystalline solid state. With this and like substances it is often found necessary to induce crystallization of the liquid as the temperature falls to the melting point, otherwise it is found possible under certain conditions to reduce the temperature of the whole body of the material to a low temperature without releasing the latent heat of fusion, which however is given out when the substance resumes the solid crystalline form. We have found that one of the surest methods of promoting recrystallization at the desired point is to keep in contact with the liquefied material unmelted crystals of the same salt, and for this purpose, where this or a like material is employed as the storage substance, each reservoir or containing vessel is provided with an extension in the form of a small tube or pocket which is always maintained at a temperature below the melting point of the substance used, by this means the liquefied material is always in direct contact with a portion of the solid substance which invariably causes the salt to start recrystallization at a temperature close to its melting point.

Figure 2:
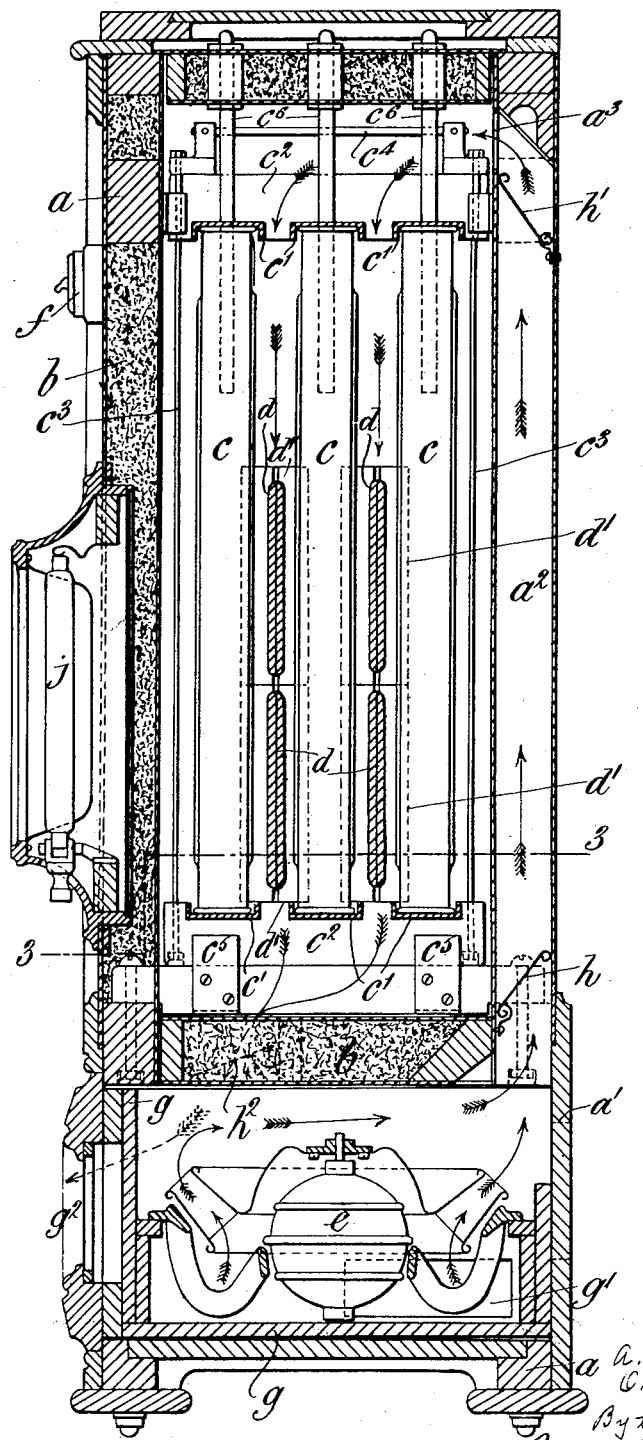
Figure 3:
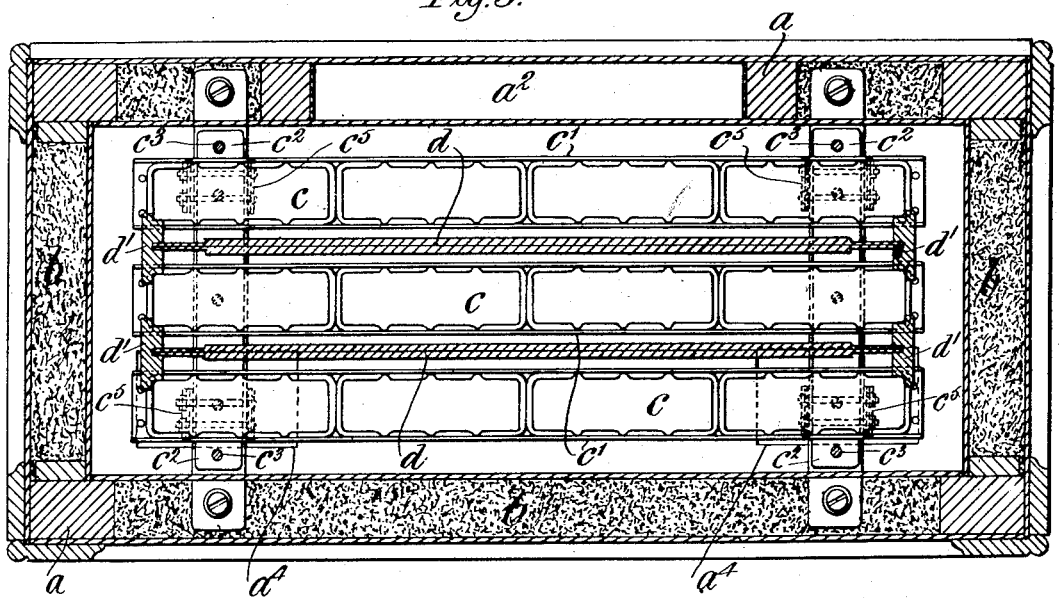
Figure 4:
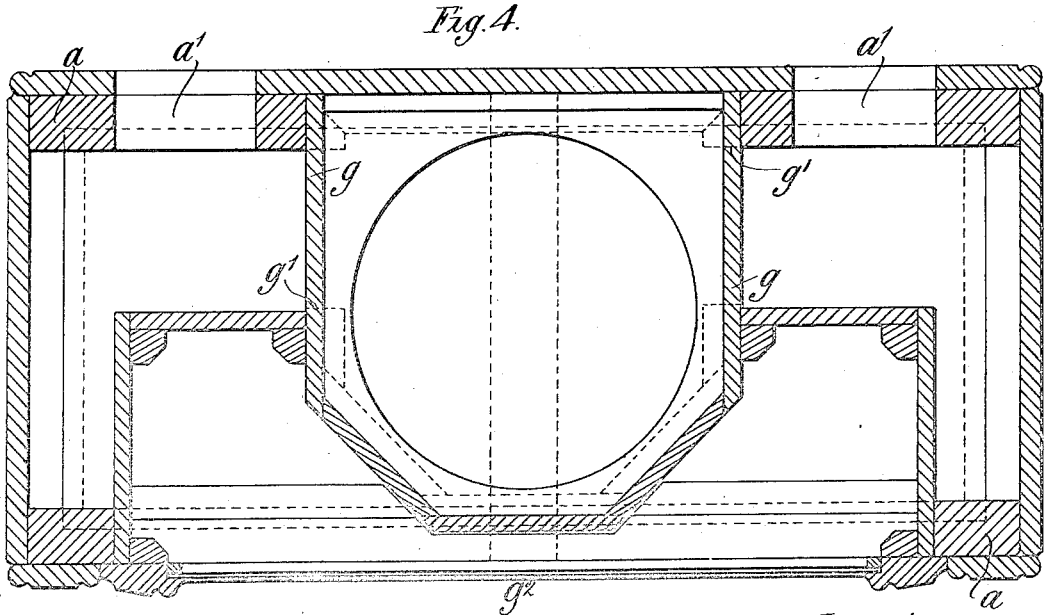

Figure 1 is a half front elevation and half vertical section of an electric thermal storage radiator equivalent to the usual hot water or steam radiator apparatus ordinarily used for warming the air of rooms, buildings, etc. Fig. 2 a section on the line 2—2 Fig. 1. Fig. 3 a section on the line 3—3 Fig. 2, and Fig. 4 a section on the line 4—4, Fig. 1.

*a* is the outer case preferably consisting of an ash wood framework lined both on the outside and inside with a thin lining material such as beaver board, uralite, poilite or other similar strong and badly conducting material.

$b$ is a lagging space which may be filled with any suitable non-conducting substance.

$c$ are the narrow tanks or reservoirs containing the storage material. As shown the three sets of tanks seen in Fig. 2 are, for convenience and mechanical strength, preferably made up of four or more smaller tanks placed side by side and supported and held between the channel bars $c'$ which are secured to the cross beams $c^2$ connected by the tie rods $c^3$ and provided with lifting bars $c^4$, the whole forming a combination which may be readily removed from the containing case. The lower beams $c^2$ are held in place by spring clips $c^5$. The adjacent small tanks forming each of the three sets are connected together by the inverted U-shaped pipes $c^6$ the uper parts of which pass outside the heat area through blocks of non-conducting material supported in the top lining of the case.

$d$ are electrical heating devices preferably consisting of rectangular sheets of thin uralite covered with asbestos paper on to which is transversely wound turns of bare chrome-nickel wire with a space of $\frac{1}{8}$th to $\frac{1}{4}$ of an inch between turns; the whole is then covered by a thin layer of asbestos, pressed, and inclosed in a thin sheet metal case extending to within about $1\frac{1}{2}$ inches of the ends. The apparatus shown has four such heating devices arranged in two sets which may be connected electrically either in parallel or series, according to the supply pressure to which the apparatus is connected. The two lower resistances are preferably so adjusted as to supply approximately the amount of heat equal to the losses from the apparatus when the desired maximum temperature therein has been reached, and these coils are then directly connected to the source of electrical supply. The two upper resistance coils are so adjusted that together with the lower coils, they make up the total required maximum rate of heat input and are connected to and controlled by a thermostatic switch as hereinafter described which automatically reduces the rate of input when the desired maximum temperature has been attained. The coils $d$ are placed between the three sets of tanks $c$ and supported and held thereto by the insulating blocks $d'$ at the ends of the tanks.

$e$ is a forced draft fan preferably of the centrifugal type shown, which may be operated and controlled by regulating switches $f$ fixed on the outside of the case. The fan is inclosed in a central box or chamber $g$ forming part of a drawer fitting into the bottom part of the apparatus. The inlet air after passing through the openings $a'$ in the back of the case is drawn into this central chamber through side openings $g'$ below the level of the fan disk or impeller through which it passes and is forced upward into the duct $a^2$ formed between the back linings of the case and which communicates with a narrow longitudinal slot or opening $a^3$ in the inner lining immediately below the top cover of the apparatus. On entering through the opening $a^3$ into the thermal chamber the air flow divides and passes downward over the heating surfaces of the storage vessels and heating coils. Two outlet openings $a^4$ are provided in the bottom of the heat chamber near the front part of the apparatus and on either side of the fan box, the air discharged therefrom passing into the bottom drawer and thence into the longitudinal airway $g^2$ formed at the front of the drawer and is there discharged to the room. Automatic louvers $h$ $h'$ $h^2$ consisting of light, or nearly balanced hinged dampers, opened by air pressure generated when the fan is run, may be provided within the air ducts and openings in such a way as to prevent losses due to local air currents during the storage periods. Where it is desired to distribute the discharged air over a larger area of floor space the longitudinal airway $g^2$ may be elongated in either direction and fitted with two or more discharge openings separately controlled by dampers or valves as may be desired.

$j$ is an external radiator of the ordinary radiant heat type, shown as consisting of eight 50 watt linolite lamps, the supply to which may be arranged and controlled in any suitable manner by external switches $k$ placed on the case. Preferably the supply to these lamps is so arranged that four consuming 200 watts may receive energy which is diverted from the inside heating coils, while the remaining four take their supply directly from the main, the external radiator when thus in operation only increasing the maximum demand of the whole apparatus by 200 watts per hour when all lamps are on.

$l$ is a thermostatic switch set into the side of the outer case in such a way that the diaphragm box is within the internal heat area. This switch is so constructed that it reduces the rate of input to the coils $d$ when the temperature of the air inside the casing reaches the desired maximum say 200° F. As above described this is preferably done by cutting off the current from the upper coils $d$.

The apparatus shown has a storage capacity between the working temperatures of 100° and 200° F. of 15,000 Br. th. units and is arranged to give the best result when charging for not less than 16 hours and discharging for not more than 8 hours in each period of 24 hours. Charging and discharging may occur intermittently according to circumstances, but so long as the relation between the two operations is maintained the apparatus can be supplied with heat from the external source at an even rate throughout the 24 hours. The discharge rate at which heat is abstracted from the apparatus may be controlled at will by varying the quantity of air passed through the casing by regulating the speed of the forced draft fan $e$ which is driven by a small motor controlled by the four switches $f$ on the front of the apparatus.

The apparatus is fitted with two sets of heating coils supplied with electric energy and so constructed that they may be coupled to the ordinary town supply service at 100 or 200 volts. The maximum rate of consumption is 375 watts per hour when charging or discharging, the thermostatic switch reducing the supply after completion of the charging period. The total thermal units obtainable from the storage element is approximately 15,000 Br. th. units and the maximum rate of discharge therefrom about 4,500 Br. th. units per hour, falling to 1,500 near the end of the discharge period. The heat directly obtainable from the heating coils remains constant at 1,280 Br. th. units per hour. When first brought into use the total heat obtainable from the apparatus is thus at the rate of nearly 6,000 Br. th. units per hour, gradually falling when the apparatus remains fully opened up to about 2,500 Br. th. units for the eighth hour of discharge, when the effective discharge of the storage element will be normally exhausted. The total heat obtainable from the apparatus both from the storage element and the direct supply is thus approximately 25,000 Br. th. units over a period of 8 hours. When fully charged, the apparatus can when required, furnish heat at a rate equivalent to a direct rate of demand on the supply source of over 2 k. w. per hour as compared to the actual maximum input of .375 k. w. per hour, thus enabling a room to be quickly warmed by a large and rapid supply of heated air effectively delivered and distributed near the floor level. The maximum demand on the supply source is very materially reduced, while the even and continuous supply renders the cost of energy relatively small.

What we claim is:—

1. The combination of a casing having two openings near its bottom, a heat reservoir and a heating device within the casing and a fan adapted to draw air in at one opening and expel it at the other.

2. The combination of a casing having two openings near its bottom, a heat reservoir and a heating device within the casing, a fan adapted to draw air in at one opening and expel it at the other, and automatic means for preventing the circulation of air within the casing when the fan is out of operation.

3. The combination of a casing, a plurality of heat reservoirs arranged parallel to each other within the casing and a plurality of heating devices situated between the reservoirs.

4. The combination of a casing, a plurality of flat heat reservoirs arranged vertically and parallel to each other within the casing, a plurality of heating devices situated between the reservoirs and a fan adapted to circulate air through the casing past the reservoirs and heating devices.

5. The combination of a casing having two openings near its bottom, a plurality of heat reservoirs arranged vertically and parallel to each other within the casing, a plurality of heating devices situated between the reservoirs and a fan adapted to draw air in at one opening and force it downward past the reservoirs and heating devices and out through the other opening.

6. The combination of a casing having two openings near its bottom, a plurality of heat reservoirs arranged vertically and parallel to each other within the casing, a plurality of heating devices situated between the reservoirs, a fan adapted to draw air in at one opening and force it downward past the reservoirs and heating devices and out through the other opening, and automatic means for preventing the circulation of air within the casing when the fan is out of operation.

7. The combination of a casing, a plurality of heat reservoirs arranged parallel to each other within the casing, a plurality of heating devices situated between the reservoirs, and a thermostat controlling the supply of heat to some only of the heating devices.

8. The combination of a casing, a plurality of flat heat reservoirs arranged vertically and parallel to each other within the casing, a plurality of heating devices situated between the reservoirs, a thermostat controlling the supply of heat to some only of the heating devices, and a fan adapted to circulate air through the casing past the reservoirs and heating devices.

9. The combination of a casing having two openings near its bottom, a plurality of heat reservoirs arranged vertically and parallel to each other within the casing, a plurality of heating devices situated between the reservoirs, a thermostat controlling the supply of heat to some only of the heating devices, and a fan adapted to draw air in at one opening and force it downward past the reservoirs and heating devices and out through the other opening.

10. The combination of a casing having two openings near its bottom, a plurality of heat reservoirs arranged vertically and parallel to each other within the casing, a plurality of heating devices situated between the reservoirs, a thermostat controlling the supply of heat to some only of the heating devices, a fan adapted to draw air in at one opening and force it downward past the reservoirs, and heating devices and out through the other opening, and automatic means for preventing the circulation of air within the casing when the fan is out of operation.

ALFRED FRANK HARRISON.
OLIVER LEOPOLD PEARD.

Witnesses:
O. J. WORTH,
W. E. ROGERS.